United States Patent [19]
Muller et al.

[11] Patent Number: 5,593,798
[45] Date of Patent: Jan. 14, 1997

[54] ION IMPLANTATION OF HIGHLY CORROSIVE ELECTROLYTE BATTERY COMPONENTS

[75] Inventors: Rolf H. Muller; Shengtao Zhang, both of Berkeley, Calif.

[73] Assignee: The Regents of the University of California, Oakland, Calif.

[21] Appl. No.: 909,047

[22] Filed: Jul. 6, 1992

[51] Int. Cl.$^6$ ............................................. H01M 4/66
[52] U.S. Cl. ........................ 429/245; 427/528; 427/531
[58] Field of Search ........................... 429/245; 427/528, 427/531; 29/623.5

[56] References Cited

U.S. PATENT DOCUMENTS

| | | | |
|---|---|---|---|
| 4,132,828 | 1/1979 | Nakamura et al. | 427/531 X |
| 4,346,153 | 8/1982 | Rigal et al. | 429/245 X |
| 4,542,009 | 9/1985 | Pauder | 427/528 X |
| 4,731,539 | 3/1988 | Xu | 427/528 |
| 4,849,082 | 7/1989 | Baty et al. | 427/531 X |
| 4,973,388 | 11/1990 | Francois et al. | 427/531 X |

FOREIGN PATENT DOCUMENTS 269112  6/1988  European Pat. Off. ............... 427/531

*Primary Examiner*—Stephen Kalafut
*Attorney, Agent, or Firm*—Kathleen Dal Bon; Paul R. Martin

[57] ABSTRACT

A method of producing corrosion resistant electrodes and other surfaces in corrosive batteries using ion implantation is described. Solid electrically conductive material is used as the ion implantation source. Battery electrode grids, especially anode grids, can be produced with greatly increased corrosion resistance for use in lead acid, molten salt, end sodium sulfur.

17 Claims, 3 Drawing Sheets

5,593,798

ION IMPLANTATION OF HIGHLY CORROSIVE ELECTROLYTE BATTERY COMPONENTS

The invention described herein was made with Government support under Contract No. DE-AC03-76SF00098 between the U.S. Department of Energy and the University of California for the operation of Lawrence Berkeley Laboratory. The Government has certain rights in this invention.

BACKGROUND OF THE INVENTION

The present invention relates to ion implantation of battery components such as electrodes for use in batteries with highly corrosive chemical electrolytes. Among other advantages, this inventive treatment process gives battery components a greatly increased resistance to chemical corrosion during battery operation and storage.

Ion Implantation Techniques

Various forms of ion implantation have been used to improve the properties of surfaces. These modifications can be accomplished using ion implantation to alter the chemical structure of the surface and to mechanically modify the physical structure of the surface. Typically, chemical modification takes the form of insertion of ions of solid material into the surface of a solid body. This technology has been limited to small scale treatment of flat surfaces, such as in semiconductor technology. Mechanical modification is accomplished by producing defects and other physical changes on the surface of a material. This technology allows larger scale applications. The treated substrate is generally a hard metal surface.

The use of ion implantation technology allows the production of mixed material surface layers on bulk metal bodies. These implanted metallic surface layers enjoy considerably better adhesion to the substrate surface than those produced by plating or other techniques because of the gradual change in composition with distance from the surface.

In contrast to alloy methods, the ion implantation of materials has the advantage of conserving expensive materials by limiting their application to the surface of a component rather than being distributed throughout the bulk material.

Ion implantation processing can physically improve the mechanical performance of the object's surface, such as its wear characteristics. Rare earth ions implanted in iron and steel and tin ions implanted in titanium are effective in improving wear resistance. Titanium and carbon ions implanted in steel can reduce the surface friction by a factor of two.

Ion implantation techniques can provide for a surface with specific chemical characteristics. The implantation of the correctly selected metallic atom species can influence the chemical properties of metal surfaces, such as corrosion, oxidation, and catalytic properties.

Ion implantation used for the chemical modification of surfaces has a broad range of applications. For instance, one can produce catalytic surfaces on a solid, non-catalytic bulk material. Using ion implantation, the properties of electronic materials can be controlled in order to manufacture integrated circuits. Ion implanted surfaces have a number of advantages over bulk alloys. The layers are very thin, and the vast reduction in diffusion times means reactions occur faster and at lower temperatures than in conventional metallurgy.

Ion treatment of surfaces during which little or minimal ion implantation occurs has also been demonstrated to produce physical modification of surfaces, in some cases with improved tribiological properties. Surface defects and other modifications can be produced using ion implantation by nobel gasses. In this processing technique the chemical makeup of the treated surface remains substantially unaltered.

The surfaces of certain metals have been treated by ion implantation to improve their physical toughness and corrosion properties under various conditions of hard physical wear. Various research groups have used ion implantation to accomplish a physical toughening of the surfaces of iron (Ashworth, et al, *Corrosion Science*, 17, 1977, p. 947), aluminum (Natishan, et al, *Nuclear Instruments and Methods in Physics Research*, B59/60, 1991, p. 841), and steel (Nielsen, et al, Ibid, Vol. 59/69, p. 772).

Both mixed material and physical modification techniques were used by the above cited researchers to accomplished the desired results. A typical example of these research efforts is ion implantation of hard metals with tantalum, which because of its known effect in alloys increases the physical toughness of the target surface. Implantation of a metal's surface with argon, by contrast, appears to increase surface toughness by introducing physical changes to the surface of the material.

Limitations of Batteries With Highly Corrosive Electrolytes

Corrosion of the electrodes and other internal battery surfaces in lead-acid and other highly corrosive electrolyte batteries is a chronic difficulty, and an impediment to broad application of these batteries. Corrosion is a particular problem on the positive plates, and is an important factor that limits the cycle life of a highly corrosive electrolyte battery.

The difficulties in providing for a commercially practical lead-acid battery in view of the corrosive nature of the inner battery environment have been described in various publications. Examples of such reports are from Caniel et al (*Electrochim. ACTA*, Vol. 20, p. 781, 1983) and Guo et al (*Journal of the Electrochemical Society*, Vol. 138, p. 1222, 1991).

Examples of other highly corrosive electrolyte batteries with currently limited applicability are molten salt (Li/$FeS_2$), and sodium sulfur (Na/S) batteries. The electrodes of these batteries are typically of a complex three-dimensional structure with metal mesh current collectors and metal cases. In the case of lead acid batteries, the electrode is composed of a soft, malleable material. All of these electrodes are subject to substantial corrosion due to both their high electrical potential and the highly corrosive nature of their electrolyte. Other battery components, such as metal battery cases, also need protection.

It would be an important advancement in the lead-acid and highly corrosive electrolyte battery art if it were possible to substantially decrease the corrosion rate of metallic surfaces in such batteries.

SUMMARY OF THE INVENTION

The present invention provides for improved, highly corrosion resistant metallic electrodes and other internal battery surfaces in highly corrosive batteries such as lead acid batteries. This new quality is accomplished by implanting the surfaces of these battery components with metallic ions. Newly available broad beamed pulsed or continuous high current ion sources provide preferred methods for implanting the metallic ions in some aspects of the present invention (Brown et al, patent application Ser. No. 07/872,971, filed Apr. 23rd, 1992) now abandoned.

Prior to the present invention, corrosive material would rapidly build up on the surface of both cathodic and anodic grids of corrosive electrolyte batteries after a relatively short period. The conductive paste would then become separated from the surfaces of these grids, and the battery would lose its function to varying degrees.

Therefore, it is an object of the present invention to treat metallic materials for use in corrosive electrolyte batteries by ion implantation in order to decrease their corrosion during the life of the battery.

It is an additional object of the present invention to avoid corrosive damage of the physical structure of anodic and cathodic grids in lead-acid, molten salt, and sodium sulfur batteries.

It is a further objective of the present invention to increase the cycle life of lead-acid, molten salt, and sodium sulfur batteries.

It is yet a further object of the present invention to provide for continued close contact of the reactive material with the anode and cathode current collectors (grids) of a lead-acid, molten salt, and sodium sulfur battery throughout its functional lifetime.

GENERAL DESCRIPTION OF THE INVENTION

The present invention provides a method of greatly increasing the resistance to corrosion of battery components in corrosive electrolyte batteries. This is accomplished through implantation of the surface of these components with the ions of electrically conductive solids. Maximum charge and most efficient molarity of electrolyte can then be employed without undue concern for the longevity of the battery's electrodes or other components. The inventive teaching will, for the first time, allow the practical uses and commercial feasibility of these currently limited use battery types.

Because many implantation parameters can be selected in order to optimize electrode characteristics, customized processing to produce a desired result can be easily achieved using the guidelines which follow.

Effects of Electrode Corrosion

The surfaces whose chemical corrosion most severely limits the function of corrosive electrolyte batteries are the electrodes, particularly the anodic grids. For instance, during the typical operation of a lead-acid battery, the positive current collectors (grids) suffer from considerable chemical corrosion. This increasing corrosion in the anodic plate (grid current collector with active material paste) compromises the function of the battery dramatically. The corrosion decreases the electrical contact of the current collectors with the active material, and otherwise compromises the function of the battery. Ultimately, this corrosive action destroys the battery function entirely.

Corrosion of the anodic current collectors progressively diminishes contact of the anodic grid with the active material both physically and electrically. The physical build-up of corrosion increasingly separates the anodic grid material from the active material. Because the corrosion products are comparatively insulative, the active material becomes electrically separated from the current collectors. As the corroded material increases in volume, it spatially separates the active material from the anodic grids. This physical separation also results in progressively diminishing electrical contact between the anodic grids and the active material.

The steady deterioration of the electrodes also serves to physically compromises the structure of their grid structure. As portions of the grid weaken, their increasing brittleness and structural fragility make them susceptible to varying degrees of damage by jarring and other physical challenges such as expansion and shrinkage due to heating and cooling. Further, the electrode grid structure can become so weakened that, without any challenge, the anode can collapse of its own weight.

Figure 1:
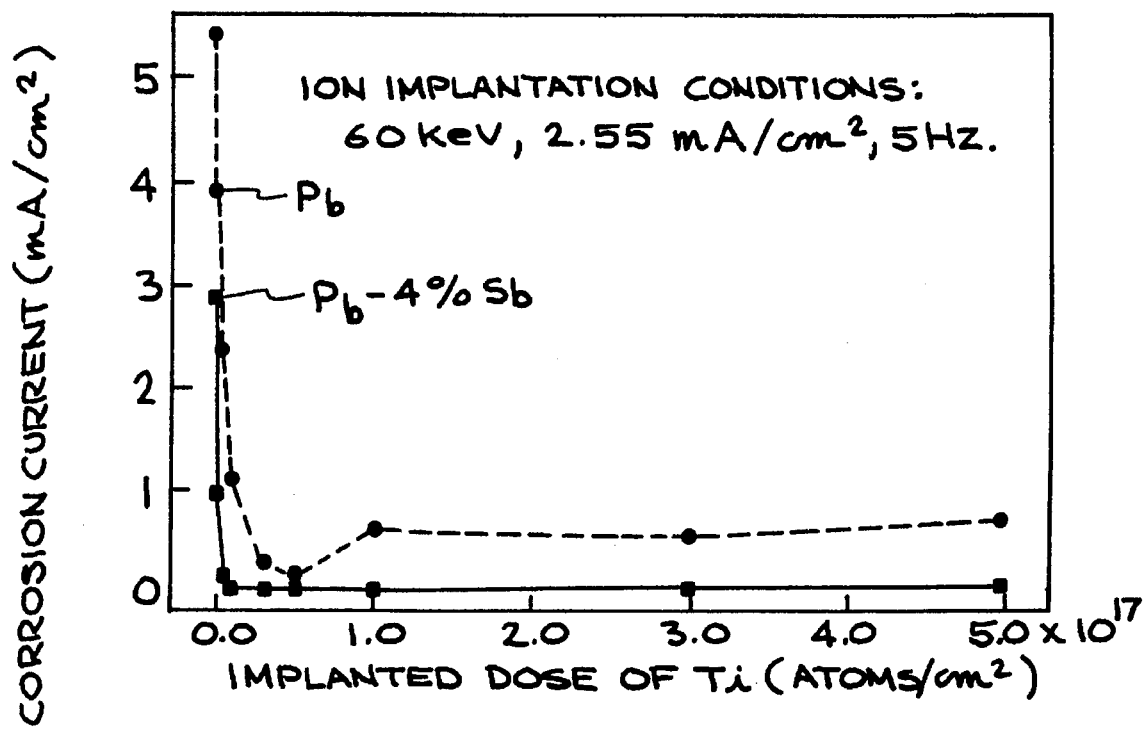
FIG. 1 is a graphic representation of the corrosion current of various electrode samples treated with different implantation doses of Ti. The dependence of the corrosion current of Pb and Pb—Sb on the dose of Ti implantation is demonstrated. The implantation for the corrosion current test was conducted at 60 keV.

The present invention provides for the chemical and physical modification of the grid electrode surface so as to obviate to varying degrees the corrosion of an electrode in the face of a strong sulfuric acid, molten salt, or nonaqueous liquid environment. Decreases in corrosion using the inventive process are monitored as a function of the corrosion current in units of mA/cm$^2$. Improved corrosion characteristics using the inventive method are shown in Tables 1 and 2 and in FIGS. 1 and 2.

Ion Implantation Facilities

Ion implantation is carried out in a vacuum environment. Within the vacuum chamber, an ion source is used to create an intense beam of ions of the implanted species. These constitute the projectile ions. The ion beam is then accelerated through a potential and transported to the target. The ion beam is run until the desired dose or implantation concentration is accumulated on the target.

Any number of ion implantation methods can be utilized to practice the present invention. Many of the facilities available which are capable of producing a broad beam of ions are limited to the implantation of gaseous ions. Those facilities that can produce high energy metal ions are often limited to small scale work, such as micro-circuitry. Thus, treating the large electrode grids of the present invention would require multiple passes and present problems for large-scale applications. However, these facilities may prove adequate for small versions of batteries containing the inventive battery components.

The ion implantation facilities developed at Lawrence Berkeley Laboratory (LBL) by Ian Brown et al. are of particular practical advantage for use in the present inventive method. It is in part due to the ready availability of these facilities that the present inventors were able to develop the subject inventive technology.

Certain aspects of the LBL ion implantation facilities have been fully described in the literature. They are cited herewith, and are incorporated into this application by reference (Brown, et al, *The Physics and Technology of Ion Sources*, Ed. Brown, Wiley, N.Y., 1987, p. 331; Brown, et al, *Applied Physics Letters*, 47, 1985, p. 358; Brown et al, *Review of Science Instr.*, Vol. 57, 1986, p. 1069; MacGill, et al, *Review of Science Instr.*, Vol. 61, 1990, p. 580; Brown et al, *Review of Science Instr*, Vol. 61, 1990, p. 577; Brown et al, *Applied Physics Letter*, Vol. 49, 1986, p. 1019).

The broad beam, high current metal ion implantation facility available at LBL is particularly advantageous in providing the ion energy level and surface coverage requirements needed in most applications of the present invention. The ion beam produced is particularly pure, and contains a high fraction of the desired metal ion species. This is because the plasma is formed solely from the cathode material where the cathode spots of the vacuum arc are active. A further reason for the purity of the metal ion species is that there is no carrier gas used in this method. This facility is described in the literature and incorporated herein by reference (Brown, et al, *Nuclear Instruments and Methods in Physics Research*, B55, 1991, p. 506). Other ion beam facilities are available at other research institutions (Yamada, *Nuclear Instruments and Methods in Physics Research*, B/59/60, 1991, p. 1467)

The LBL facility has a high-current metal ion implantation capacity with which high-current beams of virtually all the solid metals of the periodic table can be produced. The facility makes use of a metal vacuum-arc ion source which is operated in a pulsed mode, with 0.25 ms pulse duration and a repetition rate of up to 100 pps. Beam extraction voltage is of up to 100 kV, corresponding to an ion energy of up to several hundred keV because of the multiple ion charge state. Beam current at this facility is up to several amperes peak and around 10 mA time-averaged delivered on the target. Implantation is done in a broad-beam mode, with a direct line of sight from ion source to target.

A new continuous high energy wide beam apparatus is now available, and is described in Ian Brown et al patent application Ser. No. 07/872,971, filed Apr. 23rd, 1992. This particular apparatus finds special application in the method of the present invention due to its ability to control various ion beam parameters, and its capacity for fast production style treatment.

Implantation Parameters

The present invention allows for the formulation of a treatment schedule custom designed to meet the requirements of a particular highly corrosive electrolyte battery and its intended use. Many factors can be modified to optimize efficient production methods, provide for low-cost materials, and otherwise produce a practical product at the lowest possible expense. Because of the range of materials which can be used for the production of ions, an exact match is available for optimization of results with a limitation of costs.

The flexibility of the newly available, high-energy pulsed and DC broad beamed ion sources allows ion acceleration, peak current density, depth of implantation, and many other factors to be carefully adjusted. This fine control of parameters is available even during a single implantation cycle. Therefore, processing can be finely tuned to meet a particular need.

The interrelationships of implantation parameters, and their combined effect on product characteristics, has been investigated by the subject inventors. An example of this work is shown in Table 1. The results described in that table show the interrelationships of the various treatment parameters, and their beneficial effect on the corrosion current density characteristics of one embodiment of the product of the present invention. The improvement to corrosion resistance is particularly striking in the case of the lead alloy example. Relationships between individual treatment parameters for certain aspects of the present invention can be seen in Table 2 and FIGS. 1, 2 and 4.

The ion beam acceleration, or extraction voltage, describes the energy of the ion beam. This component of the ion beam parameters is given in keV. The ion beam peak current density, or flux density, is a reflection of how dense the populations of the ionized atoms is within the beam. The pulse duration and the frequency with which the pulse is delivered over the entire treatment period in coordination with beam acceleration and density determine the final dose of ionized atoms delivered to the surface of the target. Note that in the case of continuous application, the "pulse" may encompass the entire treatment period.

Ion Source Material

A variety of electrically conductive materials can be used as the source of the ion beam by which the metal surfaces are treated by the method of the present invention. Both metals and metal alloys can be employed, as well as non-metal electrically conductive materials such as carbon and silicon. The effect of several different atoms on the corrosion current of the target material in one aspect of the present invention is shown in Table 2.

It is believed that the effect of the inventive treatment is to modify the surface characteristics of the target material chemically. However, the effect is not that of a simple alloy. Because the method of the present invention intermixes the atoms in an atomically dispersed manner, a material with completely new properties is produced on the surface of the treated metal. There is also some aspect of the penetration which amplifies the corrosion resistant effect. Surprisingly, it has been found that an unusually wide array of ions can be effectively employed in the present invention to produce the desired effect.

Particularly appropriate materials as ion sources are titanium, vanadium, chromium, nickel or tungsten. However, a very wide range of metallic elements can be employed as the ion source in the present invention. Examples of these are Li, Mg, Al, Si, Ca, Sc, Ti, W, V, Cu, Mn, Co, Cu, Zn, Ge, Sr, Y, Zr, Nb, Mo, Pd, Ag, Cd, In, Sn, Ba, La, Pr, Nd, Sm, Gd, Dy, Ho, Er, Yb, Hf, Ta, W, Ir, Pt, Au, Bi, Th, and U.

Alloys and compounds can also be utilized as ion source materials. Typical materials would be stainless steel, brass, FeS, PbS, TiN, SiC, WC, and UC, among others.

Ion Beam Acceleration

After production of the ions, the ion beam must be accelerated. By careful selection of the ion beam acceleration voltage, a desired depth profile can be achieved in the present invention. As a general rule, greater acceleration for any particular material will provide for a greater depth of penetration of the target material. Ions which had been implanted near the surface of the target may also be driven to a further depth by subsequent ion bombardment during the same or subsequent treatments. The depth profile of implanted ions can be adjusted using consecutive treatment of the surface by the same or different ion species at various accelerations.

For lighter ion materials, greater acceleration is generally required to achieve the desired depth of penetration, depending on the composition of the substrate. In the case of very light ionic materials, it is difficult to achieve any implantation at all. In that case, low acceleration ion bombardment is provided to allow surface deposition. This first ionic application is followed by a high acceleration ion application which drives the surface deposited species to a desired depth into the target substrate. Particularly high acceleration of light ions may result in failure to deposit and only serve to abrade the target surface. Thus, they should be avoided.

A bifurcated acceleration treatment regimen can be useful in other aspects of the subject invention as well. For instance, an initial low acceleration beam treatment can be provided, followed by a high acceleration treatment. The first treatment would serve to toughen the target's surface so that the target could better withstand the mechanical, heat, and other impacts of a second, higher acceleration treatment. In this way, certain heat or impact sensitive materials can none the less benefit from the method of the present invention without undue damage.

Differential depths of multiple ion species can be controlled using a two tiered treatment method. A second level acceleration treatment can serve to drive many of the shallowly embedded light ions of a first treatment to appropriate depths in the substrate, where the depth of the heavy species is less critical. Thus, low weight ion species bombardment can be followed by ions of a higher mass in order to drive the first species to a depth not otherwise possible.

The two-tiered treatment approach is also useful in the present invention in the application of a mixture of ionic elements, such as when a mixed material surface is the goal of the treatment. A first ionic species can be applied at a first acceleration to deliver it to an appropriate depth. This first application would then be followed by treatment with a second ionic species which is provided at its optimal acceleration, differing from that of the first application. As a result of this two-tiered approach, dissimilar components of an alloy can be embedded at their optimum depths.

The acceleration of the ions in the present invention is selected and modulated in view of many factors, including the time period of treatment, the ion used, and the desired outcome, among others. Also, the charge on the ion will influence the acceleration voltage which will be required for a particular application. The sensitivity of the substrate to ill effects of impact must also be taken into account. On the other hand, such side effects of ion implantation as substrate heating may be beneficial in the overall processing regimen. For instance, a prior heating step previously required in the manufacture of the substrate may be eliminated when the effects of ion input will provide that level of heating.

Figure 2:
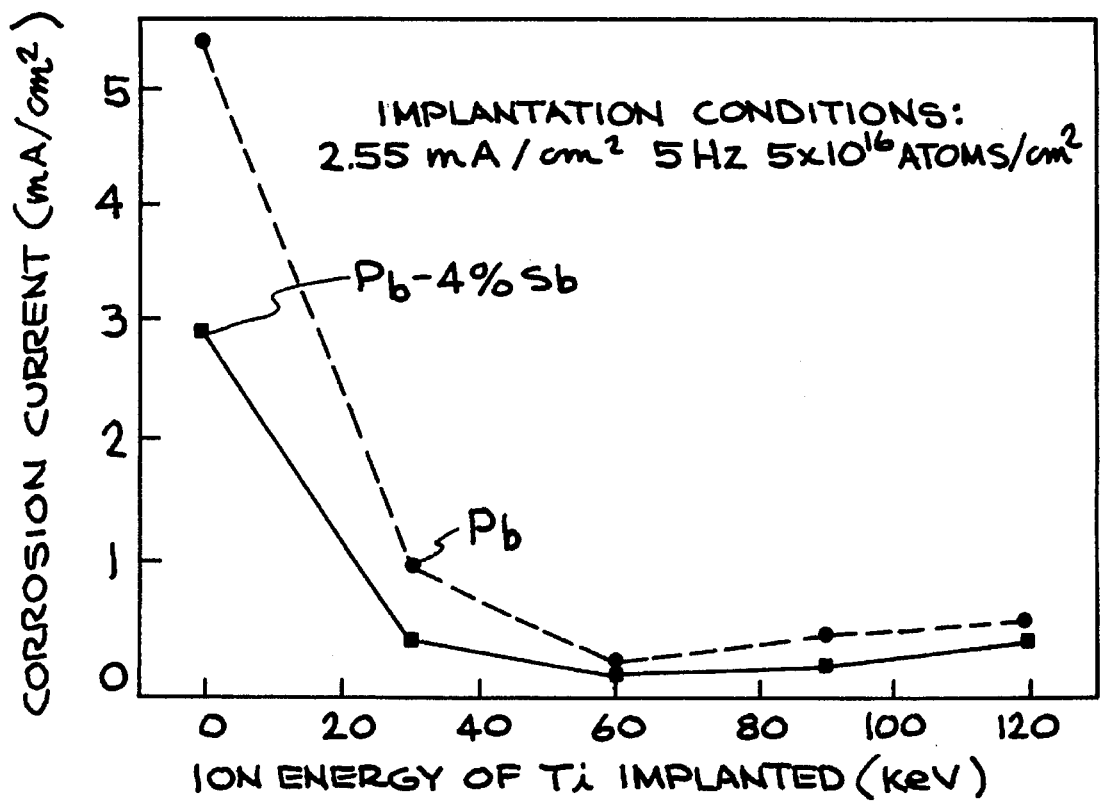
FIG. 2 is a graphic representation of the corrosion current of samples treated at different ion energies of Ti. The dependence of the corrosion current of Pb and Pb—Sb on Ti ion energy of implantation was demonstrated and carried out at a dose level of $5 \times 10^{16}$ ions/cm$^2$.

As described above, the acceleration of a single or multiple species of ion in an ion beam can be selected to provide a high level of control over the resulting production. The relationship between ion beam acceleration and corrosion resistance for one aspect of the present invention is shown in FIG. 2. The relationship of varying accelerations to ion depth profile can be seen in FIG. 3. The choice of the acceleration parameter in order to achieve a product with desired characteristics will be readily discernable to the skilled artisan, or can be derived through limited experimentation with the guidelines taught herein. The acceleration of the ion beam for certain aspects of the present invention can be at the level of about 30–200 keV. A more average range for ion acceleration is about 40–130 keV. A preferred range of ion acceleration is about 50–80 keV.

Ion Beam Current Density

The optimum current density in any particular application of the present invention can be determined by a number of factors. The greater the tolerable current density in any particular application of the present invention, the shorter the time required to provide the desired density of ion implantation.

There are a number of limitations to treating surfaces at the maximum current density available from a particular ion beam apparatus. When lengthy ion beam duration or high ion acceleration is employed, increasing the current density of the ion beam may increase various parameters to unacceptable levels. For instance, in the case of a heat-sensitive substrate, the additive effects of these three factors may result in unacceptable heat generation. Additionally, in the case of soft-surfaced substrates or when lengthy or high energy treatment is used, the risk of surface erosion to an unacceptable level is increased with increased current density.

When non-continuous ion beam application methods are used, the pulse peak current density will vary with the particular application. The range of the pulsed peak current density can vary from 1–20 mA/cm$^2$. A more typical range for the pulsed peak current density is from 2–7 mA/cm$^2$. The preferred pulse peak current density of the present invention is from 4.5–5.5 mA/cm$^2$.

Ion Beam Duration and Frequency

The duration of the beam on the target and the frequency of its application is determined by the other parameters, as above, and the desired product. If the target is of a heat sensitive material, the duration of the pulse can be shortened allowing longer periods for heat dissipation. This approach avoids compromising the surface structure of the target due to heating or other factors. Increasing the total number of bursts can to some extent produce similar results to a fewer number of bursts at a longer burst duration. Decreasing the pulse frequency can aid in mitigating the effects of high ion beam duration. For instance, greater intervening time between burst can allow heat dissipation before the onset of a subsequent burst.

In the case of a hardier target material, the ion beam treatment can proceed in a more rigorous manner, that is longer beam duration, without ill effect. Therefore, the beam duration may be chosen with more consideration to production requirements and maximization of productivity. In such cases, the direct current beam may be an appropriate choice of ion source facilities.

The size of the beam can be increased in the dc applications in order to limit energy transfer to sensitive materials, while still allowing practical production style implantation. This approach also allows the seamless application of ions to a large surface area. Lower energy beams tend to be of a much smaller cross section, and large surfaces can only be treated in overlapping parallel treatment strokes.

When the pulsed ion source is utilized, the time of the pulse can be chosen in order to maximize the desired result. An example of modification of pulse frequency can be seen in Table 1. The ion pulse can be directed at the target for about 0.05 to 0.30 milliseconds in the present invention. A more typical range for pulse duration would be from about 0.15 to 0.25 millisecond durations. A preferred range of time for ion treatment in the present invention is about 0.24 millisecond duration bursts.

Product Characteristics

The above inventive surface treatment can be tailored through choice of specific parameters in order to produce a product with desired characteristics. A typical surface to be treated in the present invention is a lead or lead alloy grid to be used as an anode in a lead-acid battery. The grid is typically of an expanded, extruded, or cast metal.

Multiangled Surface Deposition

Because of the complex, multiangled characters of many electrode grids, application techniques must be employed which allow treatment of all the necessary surfaces. This may include rotating the target during the treatment process, or having multiple angled ion guns. Alternatively, a single ion beam can be diverted into two or more ion streams approaching the target surface at different angles.

Many other surfaces of the battery interior can be improved by ion beam bombardment using the method of the present invention. In the case where other interior surfaces of the battery are to be treated, it may be useful to subject a partially assembled battery to the ion beam. In such a situation, care is taken to fully treat the grid portion of the assemblage. In this way, the use of the ion beam provides for the improvement of several surfaces in a single application. In some cases, such a multiple surface application technique will require no increase of expense of application over the ion application to the grids alone.

Ion Beam Dose

The target is treated with ions at a selected dose. The dose is measured in atoms (formed from ions) per square centimeter of target surface. The desired final dose in the subject inventive process can be achieved through a selection of the various treatment parameters described above. The advantage of ion beam implantation is that the final proportion of treated material to implanted material can differ from those obtainable by an equilibrium process. For instance, because ion implantation can be an athermal process, the target temperature can be independently adjusted. This can be done through selection of treatment parameters, target cooling systems, or both. This characteristic of the inventive treatment method allows the formation of insoluble component of metastable systems unachievable by equilibrium processes.

The final corrosion resistant properties of the inventive treated material will be strongly influenced by the ion implanted dose. This correlation is clearly demonstrated in FIG. 1. Relatively broad ranges of ion doses are available using the inventive process. As a result, the present invention allows for the production of electrode materials with a wide range of characteristics.

Depth of Implantation

The total depth to which the target is treated influences the characteristics of the products in a number of ways. Because the inventive method provides for a surface of substantial chemical resilience the depth of treatment need not be excessive for most practical uses. Therefore, production costs can be taken into account when determining the most efficacious depth to which the ions must be driven into the treated material surface. The risk of partial erosion of surface material by over-treatment must be taken into account when extreme depth or ion energy levels are contemplated. Also, intense ion beam input may affect the temperature of the substrate, and must be taken into account when determining the most useful target depth in the present invention.

When the treated surface will be extremely resilient to the operating environment of the batteries interior, or where the effective life of the battery is short, treatment depth can be extremely shallow. By contrast, where the factors in the internal battery environment are unusually harsh, the overall lifetime of the battery comparatively long, or the resistance to corrosion of the surface limited, greater depth is preferred. In the latter case, potential erosion of the material surface during battery operation is compensated for by an under layer which is also imbued with the characteristics obtained by ion implantation.

Generally, in the present inventive method, the depth of penetration into the target surface ranges from about 10–80 nm. A more average range of depth of ion penetration is about 20–60 nm. A preferred range of target depth penetration by the ions in the inventive method is about 30–40 nm.

Implantation Depth Profile

Figure 5:
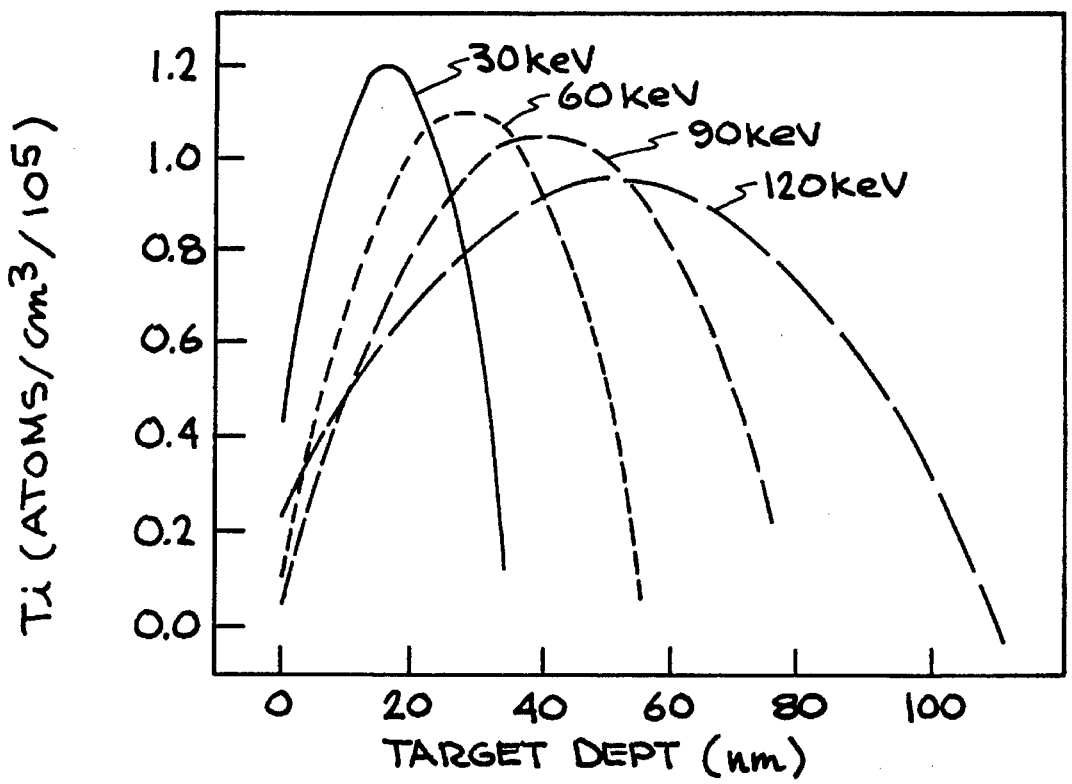
FIG. 5 shows the computed implantation depth profiles of Ti in Pb for implantation energies 30, 60, 90 and 120 keV.

In addition to the absolute depth to which the implanted ions reach relative to the target surface, the treated target has a quality which reflects the dispersal of the ions within that depth. The present inventors calculated these profiles using a computer simulation. The computed values, shown in FIG. 5, correlate very well with Auger spectroscopy analyses shown in FIG. 3.

Figure 3:
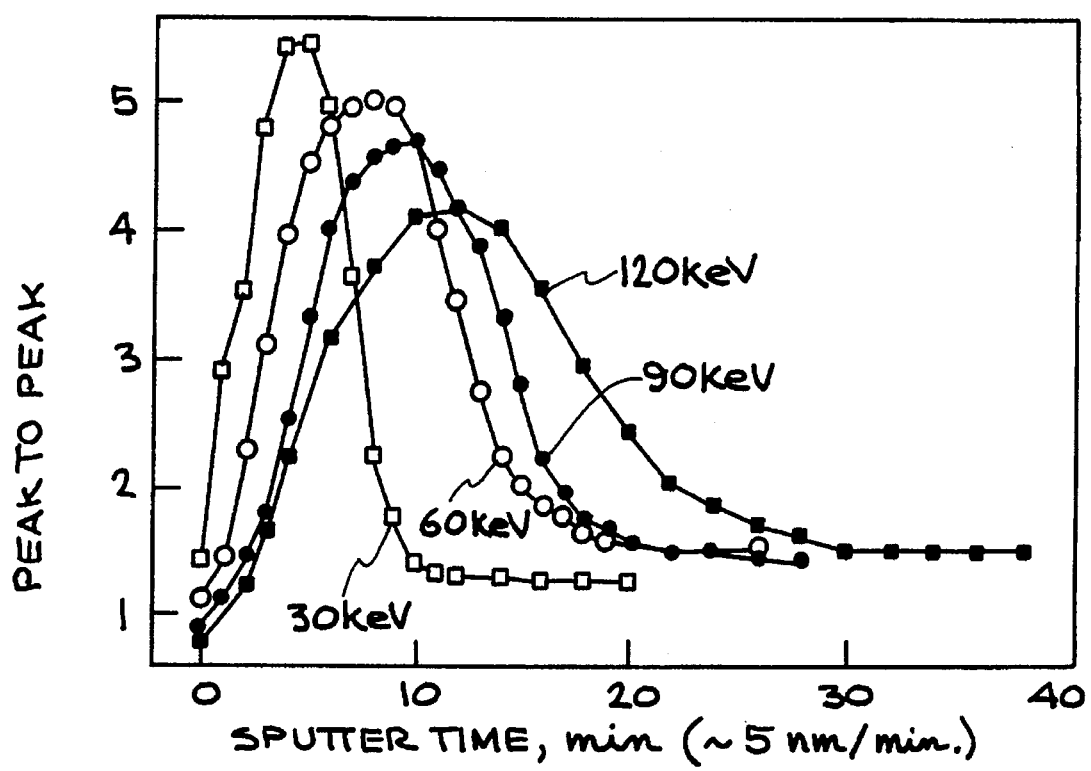
FIG. 3 is a graphic representation of the measured depth profiles of Ti distribution in Pb and Pb—4% Sb for different implantation energies and a dose of $5 \times 10^{16}$ ions/cm$^2$.

With limited experimentation such profiles can be developed for various material. By example, FIG. 3 shows the relationship between ion energy and depth profile for one aspect of the present invention. Experimental conditions were pulse peak current density 2.55 mA/cm$^2$, peak duration 0.24 ms, pulse frequency 5 Hz, implantation dose $5 \times 10^{16}$ atoms/cm$^2$. Experimental depth profiles were obtained from Auger spectra for Ti, with Ar-ion bombardment, resulting in a removal rate of Pb of approx. 5 nm/min.

In one embodiment of the present invention, the different depth profiles to Ti in Pb were determined in relation to varying implantation energies at a single dose level, as shown in FIG. 3. Thus, by varying the implantation energy, a depth profile particularly appropriate for a specific use can be obtained. Similar analyses for other materials can also be accomplished in order to calculate preferred treatment parameters in order to produce products of desired characteristics.

Corrosion characteristics can thus be modified by regulating the implantation depth profile by selecting the appropriate implantation energies. That relationship is shown in FIG. 2.

Corrosion Current Densities

The corrosion current density is a reflection of the improved qualities imparted to the treated electrode using the method of the present invention. Certain electrode materials will benefit from the inventive processing techniques to a much greater extent than others, as is demonstrated in the last two columns of Table 1. As a result, certain materials, such as alloys, which previously could not be practically considered for use in batteries with highly corrosive electrolytes can be readily employed for such uses. As a result, a much wider range of electrode materials will now be available for use in such batteries.

Because of the often surprising effects of the subject invention, limited testing of materials and techniques is useful to optimize results with previously untried materials, such testing can also minimize processing, and optimize the efficiency of the treatment system.

Figure 4A:
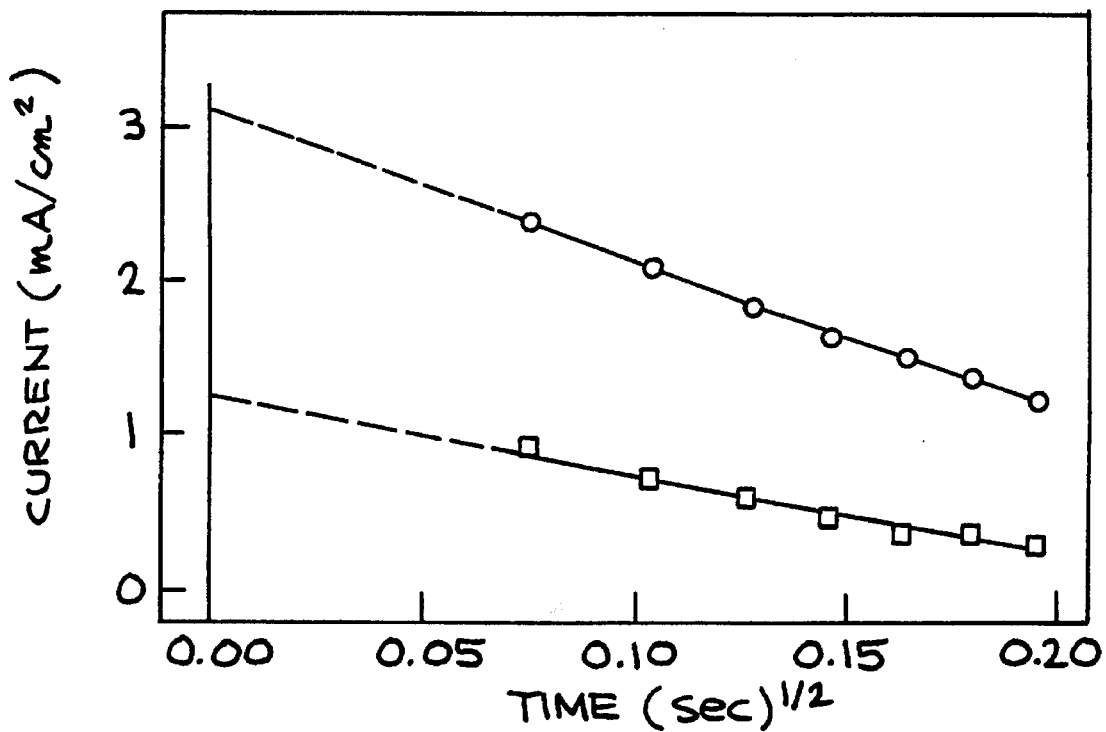
FIG. 4 shows the determination of corrosion current densities described in FIGS. 1 and 2.
Figure 4B:
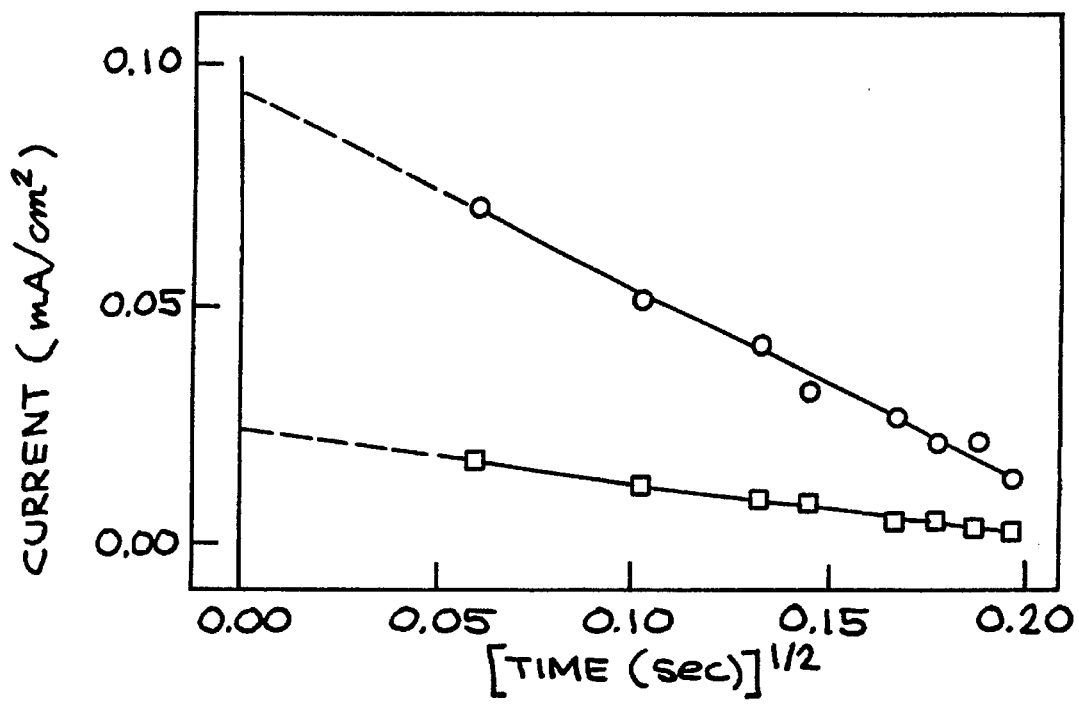

The current measurements were extrapolated to zero time as illustrated in FIG. 4 in order to represent the behavior of the original surface. The determination of the current density was calculated by extrapolation of anodic current densities in 5 molar sulfuric acid to zero time after application of an anodic polarization 8 mV vs. open circuit potential used in FIG. 4. Lead and lead-4% antimony alloy specimens are analyzed (a) before ion implantation: extrapolated current density for Pb 3.01 mA/cm², for Pb-4% Sb 1.26 mA/cm², and (b) after Ti ion implantation of 5×10¹⁶ atoms/cm², at 2.55 mA/cm² pulse peak current density, 0.24 ms pulse duration, 5 Hz pulse frequency, and 60 keV ion energy. Corrosion current density for Pb was 0.094 mA/cm² and for Pb-4% Sb was 0.024 mA/cm².

Corrosion rates were derived from the current response to small applied polarizations, E, (3–10 mV vs. open circuit potential), extrapolated from short-term measurements to zero time in order to represent the behavior of the original surface. The corrosion current, $i_{corr}$, was determined from the slope of the zero-time currents, $i_{(t=0)}$, plotted vs. the applied potential, E, according to the following equation $$i_{(t=0)} = i_{corr} \frac{nF}{RT} E$$

where n is the valence of the corrosion product (2), F is the Faraday Number (96487 Coul/mole), R is the Ideal Gas Constant (8.314 J deg⁻¹ mole⁻¹), and T is the absolute temperature (298° K.).

Corrosion data for two kinds of specimens, pure lead and lead-4% antimony alloy are given in Table 1 before and after implantation of titanium ions, conducted under different conditions.

DETAILED DESCRIPTION OF THE INVENTION

Example 1

The effect of the implantation of several ions on the corrosion current of two metal substrates, pure lead (99.99%) and a lead-4% antimony alloy in concentrated (5 molar) sulfuric acid is shown in the following. These two metals are representative grid materials in lead-acid battery plates.

Corrosion rates were derived from the current response of the specimens in 5M $H_2SO_4$ to small anodic polarization (3–10 mV), extrapolated from short-term measurements to zero time (in order to represent the behavior of the original surface).

The ion implantation was performed with a high current, pulsed ion source that has been described above. Typical beam current densities were 2.55 mA/cm² typical pulse durations 0.24 ms, and pulse frequencies 5–10 Hz. Ion beam energies of 30–120 keV, and implantation doses of 1×10¹⁵ to 5×10¹⁷ atoms/cm² were used.

The effect of the implantation of some other ions on corrosion currents is comparable to that of titanium and is illustrated in Table 2 for four other elements under on set of implantation conditions each.

Depth profiles of the implanted titanium, obtained by Auger spectroscopy, are shown in FIG. 3 for different ion beam energies. The most effective implantations involve penetration depths of a few tens of nanometers below the substrate surface.

Example 2

The inventive ion implantation method ameliorates corrosion problems in other storage batteries, particularly in those that employ corrosive molten sulfur or sulfur compounds and molten halide salts. In the high-temperature lithium/iron disulfide system with molten halide electrolytes, the molybdenum presently used for cell case and current collectors is optionally replaced by ion-implanted stainless steel, and other economical and easily shaped materials can also be employed. In the sodium/sulfur cell, the prior art diffusion-bonded or electroplated chromium coatings on the mild steel cases that do not provide sufficient calendar life are replaced by chromium implantation.

TABLE 1

Effect of titanium ion implantation conditions on the corrosion of lead and lead-4% antimony alloy in 5M sulfuric acid.

| Implantation Conditions | | | | | Corrosion Current Density mA/cm² | |
|---|---|---|---|---|---|---|
| energy | dose | Peak current density | pulse duration | pulse frequency | | |
| keV | atoms/cm² | mA/cm² | ms | Hz | Pb | Pb-4% Sb |
| 0 | 0 | 0 | 0 | 0 | 5.4 | 2.9 |
| 30 | 5 × 10¹⁶ | 2.55 | 0.24 | 10 | 0.96 | 0.34 |
| 60 | 5 × 10¹⁶ | 2.55 | 0.24 | 10 | 0.17 | 0.046 |
| 90 | 5 × 10¹⁶ | 2.55 | 0.24 | 10 | 0.37 | 0.11 |
| 120 | 5 × 10¹⁶ | 2.55 | 0.24 | 10 | 0.50 | 0.32 |
| 60 | 1 × 10¹⁵ | 2.55 | 0.24 | 5 | 3.9 | 0.97 |
| 60 | 5 × 10¹⁵ | 2.55 | 0.24 | 5 | 2.4 | 0.18 |
| 60 | 1 × 10¹⁶ | 2.55 | 0.24 | 5 | 1.1 | 0.050 |
| 60 | 3 × 10¹⁶ | 2.55 | 0.24 | 5 | 0.29 | 0.043 |
| 60 | 5 × 10¹⁶ | 2.55 | 0.24 | 5 | 0.15 | 0.040 |
| 60 | 1 × 10¹⁷ | 2.55 | 0.24 | 5 | 0.61 | 0.044 |
| 60 | 3 × 10¹⁷ | 2.55 | 0.24 | 5 | 0.56 | 0.069 |
| 60 | 5 × 10¹⁷ | 2.55 | 0.24 | 5 | 0.69 | 0.058 |

TABLE 2

Effect of the ion implantation of different atoms on the corrosion of lead and lead-4% antimony alloy in 5 molar sulfuric acid.

| | Implantation Conditions | | | | | Corrosion Current Density mA/cm$^2$ | |
|---|---|---|---|---|---|---|---|
| atom | energy keV | dose atoms/cm$^2$ | peak current density mA/cm$^2$ | pulse duration ms | pulse frequency Hz | Pb | Pb-4% Sb |
| Ti | 60 | 5 × 10$^{16}$ | 2.55 | 0.24 | 5 | 0.15 | 0.040 |
| V | 60 | 5 × 10$^{16}$ | 2.55 | 0.24 | 10 | 0.20 | 0.053 |
| Cr | 60 | 5 × 10$^{16}$ | 2.55 | 0.24 | 10 | 0.27 | 0.093 |
| Ni | 60 | 5 × 10$^{16}$ | 2.55 | 0.24 | 10 | 0.18 | 0.085 |
| W | 180 | 5 × 10$^{16}$ | 2.55 | 0.24 | ~3 | 0.81 | 0.51 |

We claim:

1. A process for improving the corrosion resistance of anodic and cathodic battery grids comprising;
   A. ionizing an electrically conductive material,
   B. accelerating the ionized material, and
   C. impacting a grid structure target with the ionized material.

2. The process of claim 1, wherein said electrically conductive material is a metal or metal alloy.

3. The process of claim 2, wherein said metal is selected from the group comprising Ag, Al, Au, Ba, Ca, Cd, Dy, Ce, Co, Cr, Cs, Cu, Er, Fe, Ga, Gd, Hf, Hg, Ho, In, Ir, K, La, Li, Mg, Mn, Mo, Na, Nb, Nd, Ni, Os, Pb, Pd, Pr, Pt, Rb, Re, Rh, Ru, Sb, Sc, Sm, Sn, Sr, Ta, Th, Ti, U, V, W, Y, Yb, Zn, Zr.

4. The process of claim 3, wherein said metal is selected from the group comprising titanium, vanadium, chromium, nickel, or tungsten.

5. The process of claim 1, wherein the ionized material is accelerated at about 30–200 KeV.

6. The process of claim 5, wherein said material is accelerated at about 40–130 KeV.

7. The process of claim 6, wherein said material is accelerated at about 50–80 KeV.

8. The process of claim 1, wherein said ionized material is delivered in pulses, and wherein the pulse peak current density is about 1–20 mA/cm$^2$.

9. The process of claim 8, wherein the pulse peak current density is about 2–7 mA/cm$^2$.

10. The process of claim 9, wherein the pulse peak current density is about 4.5–5.5 mA/cm$^2$.

11. The process of claim 1, wherein the ionized material is directed at said target for pulses of about 0.05 to 0.30 millisecond duration.

12. The process of claim 11, wherein the ionized material is directed at said target for pulses of about 0.15 to 0.25 millisecond duration.

13. The process of claim 12, wherein the ionized material is directed at said target for pulses of about 0.24 millisecond duration.

14. The process of claim 1, wherein the implanted dose of the ionized material is about 10$^{14}$ to 10$^{18}$ atoms/cm$^2$.

15. The process of claim 14, wherein the implanted dose of the ionized material is about 5×10$^{15}$ to 5×10$^{17}$ atoms/cm$^2$.

16. The process of claim 15, wherein the implanted dose of the ionized material is about 2–8×10$^{16}$ atoms/cm$^2$.

17. A corrosion resistant battery component for use in a battery with a highly corrosive electrolyte comprising anodic and cathodic battery grids implanted with accelerated ions produced from an electrically conductive material.

* * * * *